United States Patent

Harmon, Jr. et al.

[15] 3,660,761

[45] May 2, 1972

[54] AUTOMATIC EQUALIZATION SYSTEM FOR DATA TRANSMISSION CHANNELS

[72] Inventors: Samuel T. Harmon, Jr.; Kenneth E. Monroe; Gino Venturi, all of Ann Arbor, Mich.

[73] Assignee: Datamax Corporation, Ann Arbor, Mich.

[22] Filed: Jan. 29, 1970

[21] Appl. No.: 6,738

[52] U.S. Cl. ....................................325/42, 178/69, 325/50, 325/65, 328/165, 333/18

[51] Int. Cl. ..........................................H04l 1/00, H04b 1/10

[58] Field of Search ......................325/42, 65, 67, 49, 50, 38; 328/155, 165; 178/69 R; 333/18 R, 28

[56] References Cited

UNITED STATES PATENTS

| | | | |
|---|---|---|---|
| 2,102,138 | 12/1937 | Strieby | 333/18 X |
| 3,390,336 | 6/1968 | Di Torro | 325/65 |
| 3,335,223 | 8/1967 | Johannesson et al. | 178/69 |
| 3,444,468 | 5/1969 | Drouilhet, Jr. et al. | 325/65 X |
| 3,403,340 | 9/1968 | Becker et al. | 325/42 |
| 2,805,398 | 9/1957 | Albersheim | 325/65 X |

*Primary Examiner*—Benedict V. Safourek

*Attorney*—McGlynn, Reising, Milton & Ethington, Martin J. Adelman, Allen M. Krass, Owen E. Perry, Thomas N. Young and Stanley C. Thorpe

[57] ABSTRACT

A system for equalizing the phase distortion of a data transmission channel is disclosed wherein the equalizer comprises a fixed delay network and a plurality of selectable delay networks. The fixed delay network exhibits an envelope delay similar to the difference between the characteristic envelope delay for the channel and a desired delay for the channel and the selectable delay networks may be connected therewith in any combination to produce the desired envelope delay. Control means are provided for successively connecting the selectable delay networks to form a successive plurality of test channels. The phase distortion produced by each channel is measured and compared with that produced by each other test channel. The control means includes means for reconnecting the combination of selectable delay networks which produce the smallest value of phase distortion to provide equalization of the channel for data transmission.

5 Claims, 13 Drawing Figures

INVENTORS
Samuel J. Harmon, Jr.,
BY Kenneth E. Monroe, &
Gino Venturi
Barnard, McGlynn & Reising
ATTORNEYS

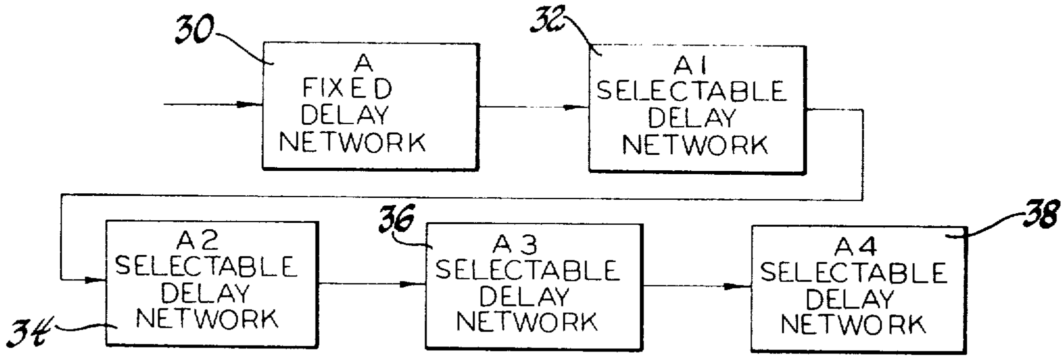
Fig. 4
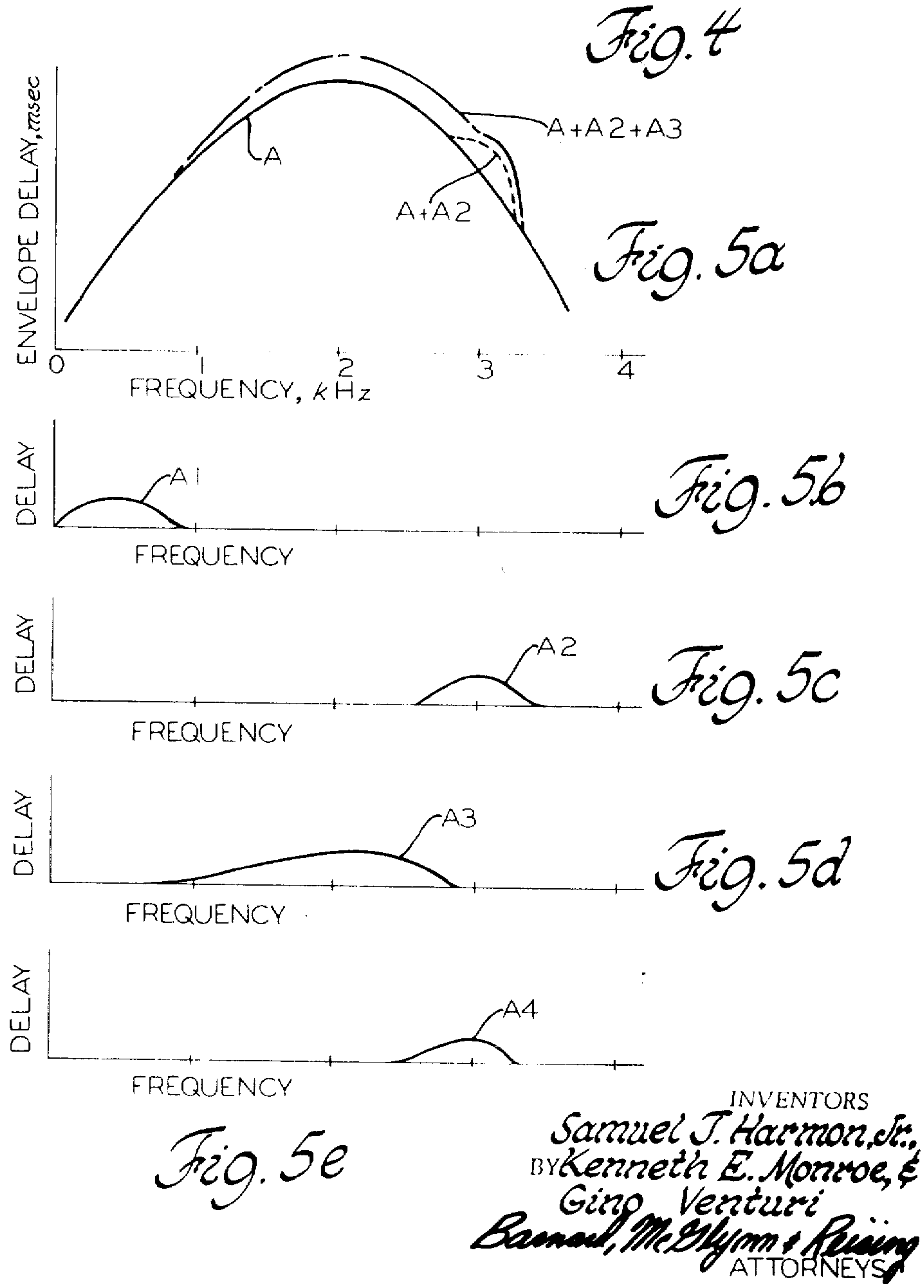
Fig. 5a, Fig. 5b, Fig. 5c, Fig. 5d
Fig. 5e
INVENTORS
Samuel J. Harmon, Jr.,
BY Kenneth E. Monroe, &
Gino Venturi
Barnard, McGlynn & Reising
ATTORNEYS INVENTORS
Samuel J. Harmon, Jr.,
BY Kenneth E. Monroe, &
Gino Venturi
Barnard, McGlynn & Reising
ATTORNEYS INVENTORS
Samuel J. Harmon, Jr.,
Kenneth E. Monroe, &
Gino Venturi
BY Barnard, McGlynn & Reising
ATTORNEYS INVENTORS
Samuel J. Harmon, Jr.,
BY Kenneth E. Monroe, &
Gino Venturi
Barnes, McGlynn & Reising
ATTORNEYS INVENTORS
Samuel J. Harmon, Jr.,
BY Kenneth E. Monroe, &
Gino Venturi
Barnard, McGlynn & Reising
ATTORNEYS

AUTOMATIC EQUALIZATION SYSTEM FOR DATA TRANSMISSION CHANNELS

This invention relates to data communication systems and more particularly to automatic equalization of a data transmission channel to minimize the effects of phase distortion in the channel.

In the development of high-speed data transmission systems, particularly those utilizing existing telephone voice channels, it is well known that one of the most limiting impairments is that of phase-frequency distortion, i.e., distortion due to deviation from direct proportionality of phase shift to frequency. Phase distortion arises from a variety of sources in transmission channels and the effect is to distort the wave shape of a modulating pulse. In the case of pulse amplitude modulation systems with the carrier and side band frequencies situated on a non-linear portion of the phase-frequency characteristic, the envelope shape is distorted and delayed. This results in a decrease in peak amplitude of the envelope and produces a quadrature component which introduces phase modulation. In data transmission this distortion causes an overlap in time between successive pulses which is called interpulse interference. It is common practice to measure the phase characteristic of a transmission channel by measurement of envelope delay with a low-frequency amplitude modulation applied to a carrier which is varied in frequency over the band of interest. Thus, a given transmission channel has a phase characteristic represented by the plot of envelope delay or delay distortion in milliseconds as a function of frequency in kilohertz. Each transmission channel will exhibit a peculiar phase characteristic which may change from time to time with environmental changes and with changes in external and internal conditions. It is known, however, that for a given type of transmission channel such as unconditioned telephone lines there is a characteristic envelope delay which is generally representative of all such lines. Such telephone lines have a bandwidth of approximately 200 to 3,000 Hertz and have a characteristic envelope delay which is minimum near the center of the band and rises steeply at both ends of the band in the manner of an hyperbola.

In data communication systems where it is desired to transmit over a number of channels which vary in their phase characteristics, it is necessary to apply corrective measures or equalization to keep the pulse distortion within reasonable limits. It has been common practice to equalize a data transmission channel by placing a network at the receiver which has a corrective envelope delay equal to the difference between the desired or equalized delay and the actual envelope delay of the data transmission channel. Envelope delay may be kept constant across the band by inserting delay networks such as reactive networks in tandem so that an envelope delay equal and opposite to that of the line is provided. It is common practice in providing equalization to use a transversal filter wherein the signal is applied to a tapped delay line and the output is obtained from a summation of signals from the several taps. Each tap is provided with adjustable means for multiplying its contribution of amplitude and polarity to the summing network to produce the output signal. Such a system utilizes the transmission of a test signal and requires the adjustment of the continuously variable outputs of a large number of taps in order to select the optimum setting for minimizing phase distortion. Such a system is capable of providing a high degree of distortion reduction but has the disadvantage of being complex when used in automatic or adaptive type of equalization systems. Such a system provides a large number of combinations of tap settings and gain settings and many such combinations do not provide useful equalization curves and hence the adjustment or readjustment is unduly time consuming.

For use in data communication systems, particularly data sets or modems of the type which utilize unconditioned telephone lines as a transmission channel, it is desired to provide an equalization system at each receiver which can be quickly adjusted and which requires a minimum of equipment. In accordance with the present invention, this is provided with a phase equalizer including a fixed delay network and a plurality of selectable delay networks, the latter being connectable in any combination with the fixed delay network and the transmission channel. The fixed delay network has a corrective envelope delay similar to the difference between the characteristic envelope delay of the transmission channel and a desired, or equalized, delay. Each of the selectable delay networks has a predetermined envelope delay which is selected so that any combination of any one or more of such networks with the fixed delay network produces a composite envelope delay which is useful for equalizing a given transmission channel.

It is desired to provide a control system for the phase equalizer which permits adjustment to be made quickly and without complex equipment. This is provided in accordance with this invention by the use of delay networks having an "off-on" control by which a given network may be switched into or out of tandem connection with the remaining selectable networks, the fixed delay network and the transmission channel. A further feature of the invention is the use of an all-pass network having a predetermined phase delay. More particularly, the all-pass network may take the form of an active filter or peaking amplifier which may be electronically switched in or out of the phase equalizer.

It is further desired in such a system to provide for automatic selection of the equalizer setting which produces the least phase distortion in the output signal without resort to an unduly large number of selectable delay networks. In accordance with the invention, this is provided by a control system which successively connects all combinations of the selectable delay networks with the combination of the transmission channel and the fixed delay network. The phase distortion is measured for each such combination and the control system reconnects that combination which produces the least distortion for the given transmission channel to be equalized. The control system utilizes digital control in the form of binary logic and automatically connects all combinations of the selectable delay network in a predetermined sequence and holds the connection long enough for test pulses to be transmitted through the transmission channel and measurement of the phase distortion thereof. A memory register is provided to identify the combination which produces the least phase distortion and the system automatically reconnects that combination after all other combinations have been tried.

In such an equalization system, it is necessary to measure the phase distortion in a short period of time with a high degree of accuracy. In accordance with the invention this is accomplished by transmitting spaced test pulses and utilizing the disturbance of the transmitted carrier preceding and following the pulse as a measure of the phase distortion produced by the transmission channel. Such disturbance arises from the temporal redistribution of the spectral energy of the transmitted carrier pulse by the dispersive effect of the transmission channel and causes a phase error in the received carrier wherever the redistributed spectral energy occurs. Thus, the inventive system measures phase distortion by detection of the phase error in the received carrier and obtains an accurate measurement by taking the average value thereof over a series of a few pulses. A preferred embodiment of the invention utilizes a phase-lock loop to detect the phase error in the carrier wave. The phase-lock loop is locked in quadrature with the average received phase of the carrier wave and the error signal of the loop has an average value of zero. However, the instantaneous value thereof reflects the phase disturbance in the received carrier wave. This instantaneous phase error signal is segregated from the remaining components of the loop control signal and utilized as a measure of the phase distortion in the transmission channel. To avoid ambiguities in the measurement, the interval between pulses is long enough so that the dispersed energy of adjacent pulses does not interfere. Furthermore, to avoid the possibility of the dispersed energy occurring in phase with the carrier wave, the pulse period may be varied slightly from pulse to pulse.

A more complete understanding of this invention may be obtained from the detailed description which follows taken with the accompanying drawings in which FIG. 1 is a block diagram of a data transmission system embodying the present invention;

FIG. 4 is a block diagram representing the phase equalizer of the present invention;

Figure 6:
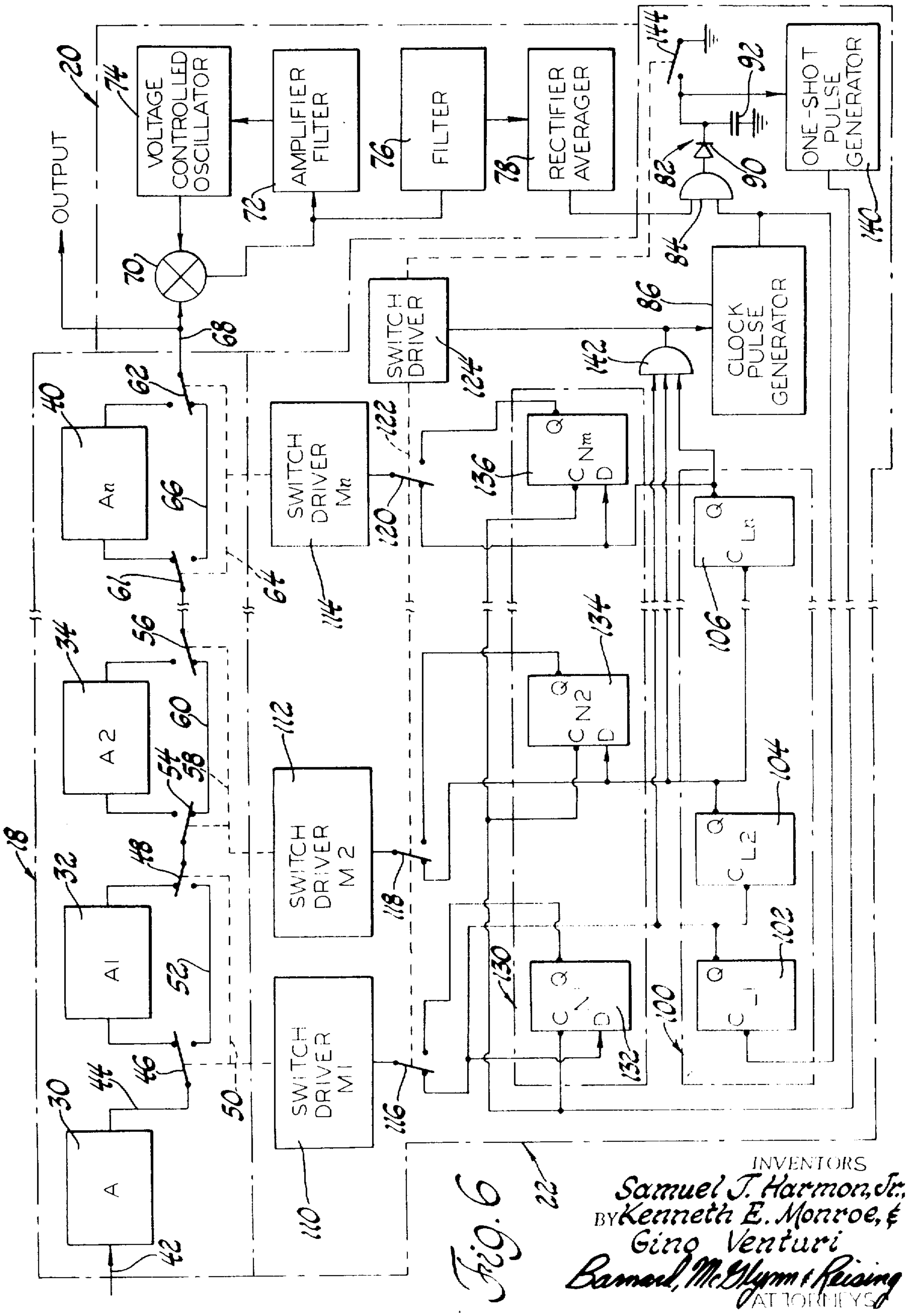
Figure 7:
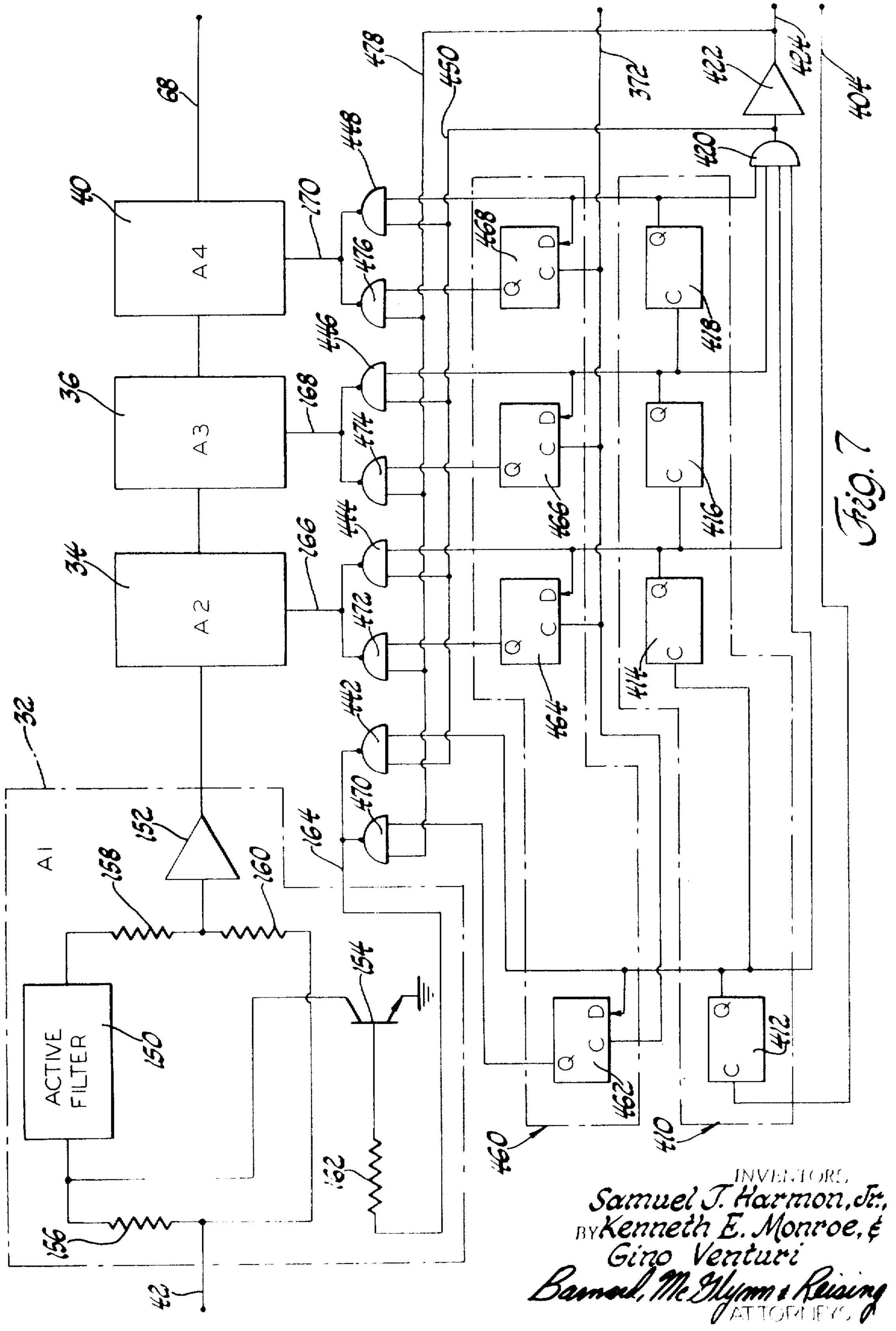
Figure 7A:
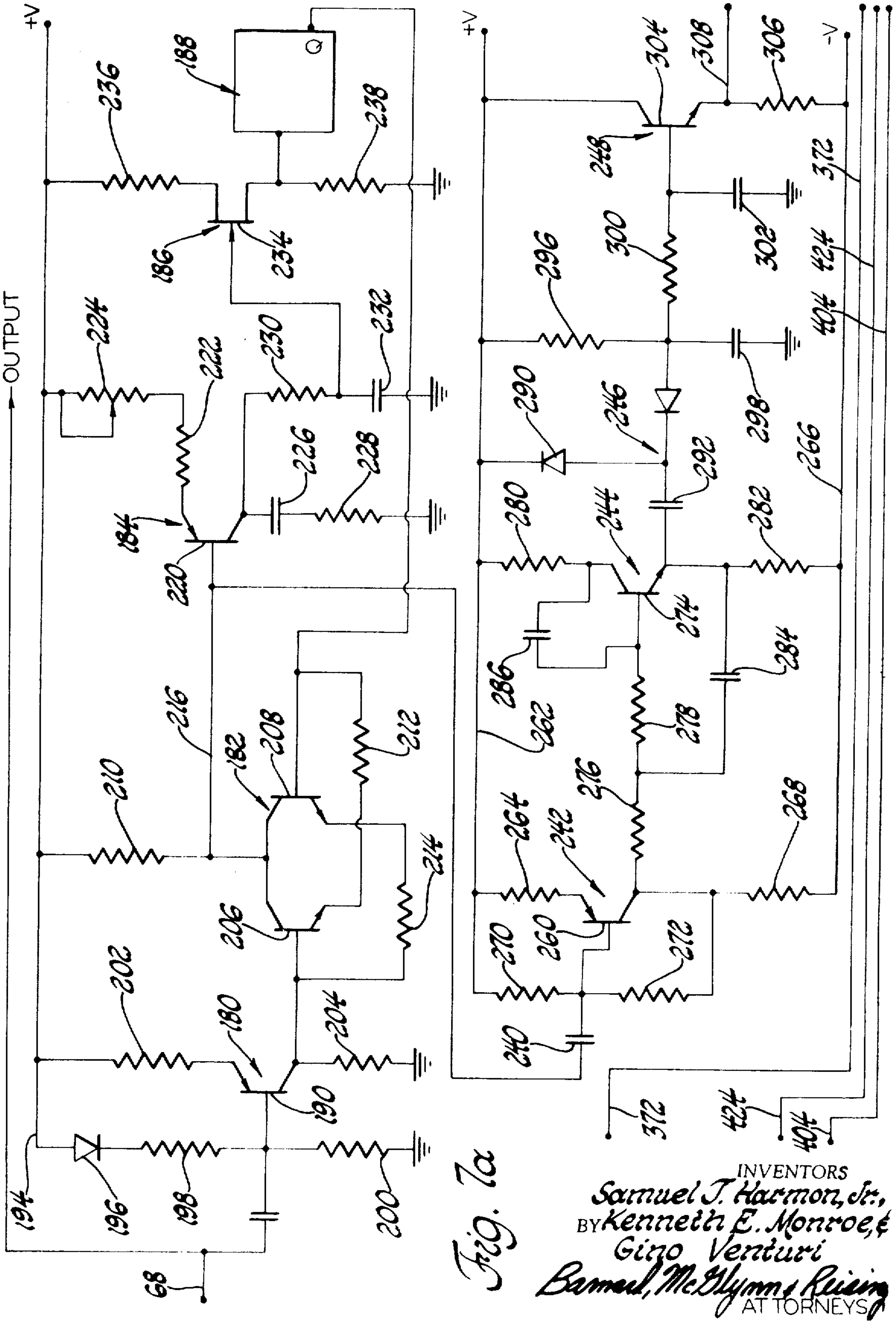
Figure 7B:
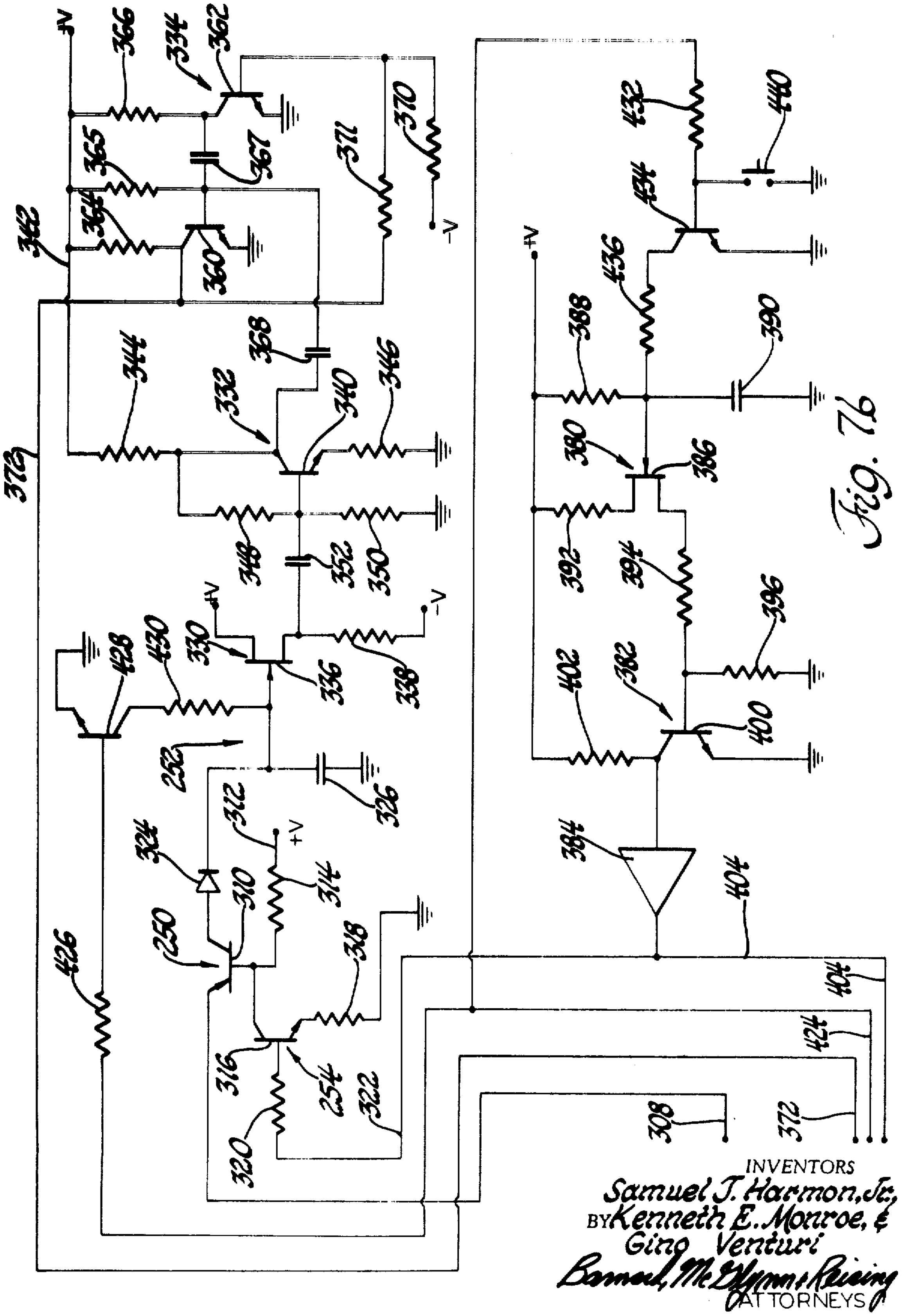

FIGS. 5*a*, *b*, *c*, *d*, and *e* are graphical representations of the envelope delay corresponding to the networks of FIG. 4;

FIG. 6 is a block diagram of the equalization system of the present invention; and FIGS. 7, 7*a*, and 7*b* taken together constitute a schematic diagram of a preferred embodiment of the present invention.

Referring now to the drawings, there is shown an illustrative embodiment of the invention in a data transmission system of the type which is especially adapted for use of unconditioned telephone lines as the transmission channel. It will be appreciated, however, as the description proceeds that the invention is not limited to such application but may be utilized with other transmission channels requiring phase equalization.

Figure 1:
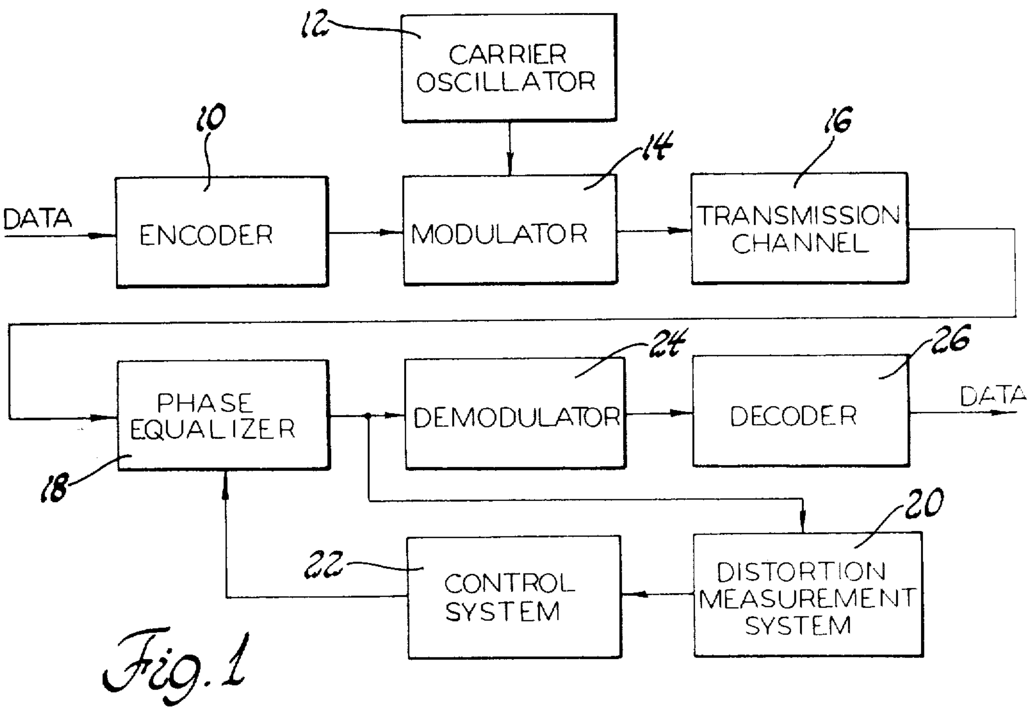

As shown in FIG. 1, a system comprises a transmitting station including an encoder 10 which accepts input data and develops electrical output pulses corresponding thereto. The transmitting station includes a carrier oscillator 12 which produces a sinusoidal carrier wave and includes a modulator 14 in which the carrier wave is modulated by the pulses from the encoder and the output thereof is applied to the transmission channel 16. In the illustrated embodiment, the modulator 14 produces pulse amplitude modulation for transmission as a vestigial side band system. The receiver station at the other end of the transmission channel 16 includes a phase equalizer 18 which in accordance with the present invention is connected with a distortion measurement system 20 and a control system 22. The output of the phase equalizer is applied to a demodulator 24 which recovers the signal from the carrier wave and applies it to a decoder 26 which develops the desired output data.

The transmission channel 16 in the form of an unconditioned telephone line exhibits certain impairments to the transmission of pulse amplitude modulated carrier wave which may significantly effect the accuracy and speed of transmission of the data signals. The most significant impairment is in the form of phase-frequency distortion which is distortion arising from a non-linear relationship between phase shift and frequency. It is known that the transmission channel which produces a phase shift proportional to frequency causes no distortion of the wave form because all components of a pulse and the pulse itself are delayed in time by an amount equal to the slope of the phase-frequency characteristic. It has been the practice to use the term "envelope delay" or "delay" to mean the slope of the phase-frequency curve and where there is a departure of envelope delay from a constant value phase distortion or delay distortion is introduced.

Figures 2, 3:
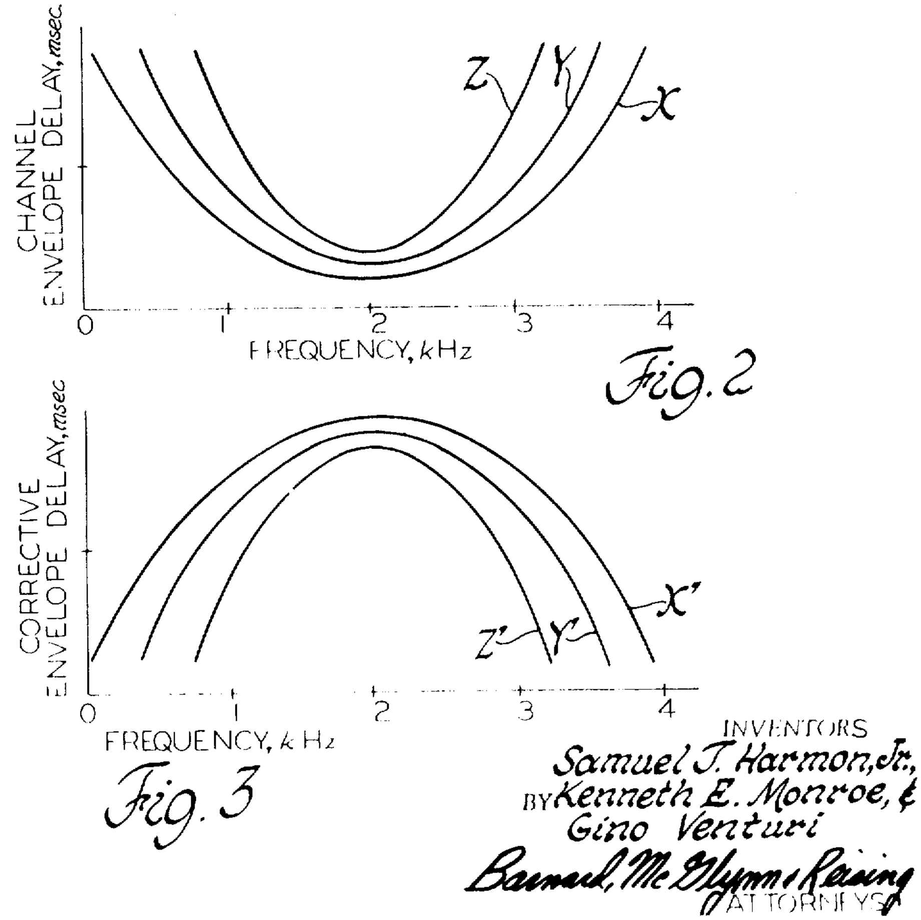
FIG. 2 is a graphical representation of the envelope delay curves for typical unconditioned telephone lines.
FIG. 3 is a graphical representation of envelope delay required for correction of the telephone lines represented in FIG. 2.

It is convenient to represent the phase distortion of a transmission channel by plotting the envelope delay as a function of frequency over the effective bandwidth of the channel. FIG. 2 represents the envelope delay in milliseconds for three different telephone lines as represented by curves X, Y, and Z. It is noted that the bandwidth of the telephone lines extends from approximately 200 Hertz to approximately 3,000 Hertz and the envelope delay is at a minimum just above the midpoint of the bandwidth and rises to a large value at the lower end and an equally large value at the upper end of the bandwidth. In order to obtain a uniform value of envelope delay over the entire bandwidth it is necessary to "equalize" the transmission channel by interposing suitable networks. As illustrated in FIG. 3, the required correction to obtain uniform envelope delay over the bandwidth would be provided by adding the envelope delay represented by curves X′, Y′, and Z′, respectively, to the telephone lines represented by curves X, Y, and Z of FIG. 2. It is apparent that equalization is achieved by the addition of corrective envelope delay equal to the difference between the desired delay which is preferably uniform over the bandwidth and the actual envelope delay produced by the transmission channel itself.

According to this invention, this corrective envelope delay is added by the phase equalizer 18 which, as illustrated in FIG. 4, comprises a fixed delay network 30 and a plurality of selectable delay networks 32, 34, and 36, and 38. It will be understood as the description proceeds that the number of selectable delay networks may vary with the particular application of the invention. For explanatory purposes four selectable delay networks 32, 34, 36, and 38 are illustrated.

The envelope delay produced by the fixed delay network 30 is graphically represented in FIG. 5*a* by the curve labeled A. It is to be noted that the corrective envelope delay function of the fixed delay network is similar to the difference between the characteristic envelope delay of the type of channel to be equalized, i.e., the telephone line and the desired envelope delay, namely the uniform delay over the entire bandwidth. The corrective envelope delay of network 30 will approximate the correction required by many telephone lines and may even be adequate for a particular one; however, it is most likely that there will be significant departure from the required corrective envelope delay for most telephone lines. Accordingly, the selectable delay networks 32, 34, 36, and 38 are adapted to produce delay functions represented respectively by the curves shown in FIG. 5*b*, *c*, *d*, and *e*. It is noted that the network 32 produces an envelope delay over a relatively narrow band adjacent the lower end of the bandwidth of the channel, as represented by curve A1. On the other hand, network 34 produces a delay over a narrow band at the upper end of the channel bandwidth. Network 36 produces a relatively small envelope delay over a wide portion of the channel bandwidth near the midpoint thereof, as represented by the curve A3. The network 38 produces an envelope delay represented by the curve A4 at the upper end of the channel bandwidth as in the case of network 34 but the curve A4 representing network 38 is of different shape. A desired corrective delay curve or composite envelope delay function may be obtained by combining the selectable delay networks with the fixed delay network, as illustrated in FIG. 5*a*. The curve A + A2 is produced by connecting the selectable delay network 34 in series with the fixed delay network 30. Similarly, the curve A + A2 + A3 is produced by connecting the selectable delay networks 32 and 36 in series with the fixed delay network. Thus, it is apparent that with a relatively small number of selectable delay networks, which may be taken in any combination with the fixed delay network, a very large number of corrective delay functions may be obtained. It is noteworthy that the characteristic function A, taken with any combination of the selectable delay networks, produces a useful delay curve for equalizing a given line.

Referring now to FIG. 6, the inventive equalization system is represented in block diagram wherein the phase equalizer 18 is connected with the distortion measurement system 20 and is controlled in response thereto by the control system 22. The equalizer 18 comprises the fixed delay network 30 and *n* selectable delay networks (designated A1 through A*n*) where *n* is any integer. For convenience, only selectable delay networks 32, 34, and 40 (corresponding to networks A1, A2, and A*n*) are illustrated, the networks between A2 and A*n*being connected to the control system 22 in the same manner as the other selectable delay networks.

In the equalizer 18 the selectable delay networks are provided with switching means which permits the connection thereof in any combination with the fixed delay network 30. For explanatory purposes in FIG. 6, the switching means are illustrated as mechanical switches but it will be apparent that electronic switching is to be employed in the preferred embodiment of the invention. The pulse modulated carrier is applied to the input 42 of the fixed delay network 30. The selectable delay network 32 is provided with a switch 46 at its input and a switch 48 at its output, such switches being shown as single pole, double throw switches with a ganged actuator 52 for operation in unison. With the switches 46 and 48 in one position, a signal path is provided from the output 44 of network 30 through the selectable delay network 32 and with the switches 46 and 48 in the other position, a shunt circuit 50 is connected around the network 32. Similarly, the selectable delay network 34 is provided with a switch 54 at its input and a switch 56 at its output with a ganged actuator 58 for operation thereof in unison. With switches 54 and 56 in the upper position, a signal path is provided through the network 34 and with the switches 54 and 56 in the lower position a shunt circuit 60 is connected around the network 34. In the same manner, the selectable delay network 40 is provided with a switch 61 at its input and a switch 62 at its output with the switches operable by an actuator 64. With the switches 60 and 62 in the upper position, a signal path is provided through the network 40 and with the switches in the lower position a shunt path 66 is connected around the network. The switching system just described thus provides an "on-off" control for the individual selectable delay networks so that any combination thereof may be switched into series connection with the fixed delay network 30. For any combination of selectable delay networks in the phase equalizer the pulse amplitude modulated carrier appears at the output 68 of the phase equalizer.

In order to develop a control signal the output of the phase equalizer is applied to the distortion measurement system 20. In general, this system comprises a phase detector 70 connected in a phase-lock loop including an amplifier-filter stage 72 and a voltage controlled oscillator 74. The output of the phase equalizer is connected with one input of the phase detector 70 and the output of the voltage controlled oscillator 74 is connected with the other input of the phase detector. The output of the phase detector is applied through the amplifier and low-pass filter stage 72 to the voltage controlled oscillator 74 whereby the oscillator frequency is adjusted to the value of the input carrier and the phase is adjusted to a quadrature relationship with the average received phase of the carrier. The output of the phase detector has an instantaneous value which reflects phase disturbance of the received carrier. This phase error signal is superimposed on the DC loop control signal of the phase-lock loop and on the double carrier frequency component which appears in the output of the phase detector. To recover the desired instantaneous phase error signal, the output of the phase detector is applied through a filter 76 which rejects the DC component and the high frequency corresponding to twice the carrier frequency. The output of the filter is applied to the input of a rectifier-averager stage 78 which produces a DC voltage at its output corresponding to the average value of the quadrature component in the received carrier wave. The rectifier-averager output is suitably clamped to a positive reference voltage so that the output thereof becomes more positive as the quadrature component, or the phase error signal, decreases in amplitude. Thus, a high degree of phase distortion is indicated by a small positive voltage output from the rectifier-averager 78 and a small degree of phase distortion is indicated by a large value of positive voltage out of the rectifier-averager 78.

In order to control the phase equalizer 18 in accordance with the distortion measurement signal, the output of the distortion measurement system 20 is applied to the control system 22. The output of the rectifier-averager is connected to a memory stage 82 through the signal input of an analog gate 84. A clock pulse generator 86 has its output connected to the gate input of the gate 84 and the output of the gate is applied through a rectifier 90 across a storage capacitor 92. The output of the clock pulse generator 86 is also connected to the input of a binary counter 100 which is suitably comprised of $n$ stages of which only the first stage 102, second stage 104 and the last stage 106 are shown, as in the case of the selectable delay networks described above. Each stage of the binary counter comprises a so-called T flip-flop which exhibits a toggle switching action and changes state in response to each signal applied to an input C so that 1 and 0 signals are alternately produced at an output Q. The output of flip-flop 102 is applied to the input of flip-flop 104 and in similar manner, the output of each stage is supplied to the input of the succeeding stage.

In order to connect a new combination of selectable delay networks in the phase equalizer under the control of the clock pulse generator, the control system is provided with a plurality of switch driver stages 110, 112, and 114 which are connected respectively with the actuators 50, 58 and 64 of the delay networks 32, 34, and 40, respectively. Switch driver 110 is provided with an input connected to the movable contact of a transfer switch 116 which in the position shown is connected through one fixed contact with the output of the flip-flop 102. Similarly, switch driver 112 is provided at its input with a transfer switch 118 and is connected with the output of flip-flop 104 and switch driver 114 is provided with a transfer switch 120 and is connected with the output of flip-flop 106. Consequently, the switch drivers are energized in accordance with the state of the flip-flops in the binary counter 100 which is determined by the count of the output pulses from the clock pulse generator 86. It is to be noted that the transfer switches 116, 118, and 120 are ganged for actuation in unison through a common actuator 122 which is actuated by a switch driver 124 to be described subsequently.

For the purpose of identifying and reconnecting the combination of selectable delay networks which produces the least distortion, there is provided a memory register 130 connected between the counter 100 and the switch drivers 110, 112, and 114. The register 130 comprises a plurality of n flip-flop stages of which flip-flop 132, 134, and 136 are shown in the drawings. Each stage is suitably a D flip-flop of the type having a pair of inputs C and D and a single output Q. The input D of flip-flop 132 is connected to the output of the counter flip-flop 102. The input D of flip-flop 134 is connected to the output of the counter flip-flop 104 and similarly the input D of flip-flop 134 is connected to the output of counter flip-flop 106. The inputs C of all the flip-flop stages in the register 130 are connected together and to the output of a one-shot pulse generator 140 which has its input connected to the output of the memory stage 82. The one-shot pulse generator is adapted to produce an output pulse each time the voltage across the capacitor 92 increases and hence in response to the connection of a combination of selectable delay networks which produces decreased phase distortion. The output Q of the flip-flop 132 is connected to the other fixed contact of the transfer switch 116 and similarly the output Q of flip-flop 134 is connected to the other fixed contact of switch 118 and the output Q of flip-flop 136 is connected to the other fixed contact of transfer switch 120.

When the clock pulse generator 86 has generated a sufficient number of pulses to advance the binary counter to a preset count corresponding to all $2^n$ combinations of the selectable delay networks, the count corresponding to the last combination is detected by an end-of-count detector 142 suitably in the form of NAND gate. The output of the detector 142 is applied to the input of the switch driver 124 which causes the actuator 122 to operate the transfer switches 116, 118, and 120 to connect the respective switch drivers 110, 112, and 114 to the outputs of the flip-flops 132, 134, and 136 respectively in the memory register. This causes the switch drivers to reconnect that combination of selectable delay networks which produces the least distortion to thereby provide equalization of the transmission channel. The switch driver 124 also actuates a switch 144 to discharge the capacitor 92 to ground and thus place the distortion measurement system in readiness for a succeeding operation. The output of the detector 142 is also applied to the clock pulse generator to terminate the output thereof.

The operation of the equalization system shown in FIG. 6 may be summarized as follows. For the purpose of automatically selecting the proper equalization for the transmission channel to be used, a series of test pulses are sent over the transmission channel from the transmitting station. The series of pulses are of sufficiently long period that the dispersed energy from one pulse does not interfere with that of an adjacent pulse. If desired, the pulse period may be varied slightly from pulse to pulse to avoid the possibility that the dispersed energy will be in phase with the received carrier thus producing an ambiguity in the measurement of the distortion. The operation of the equalization system is initiated by a clock enable signal which starts the clock pulse generator 86 and also resets the binary counter 100 and hence the register 130 to zero. Thus, initially the received pulse amplitude modulated carrier wave is applied through the fixed delay network 42 and all of the switch drivers, 110, 112, 114 are deenergized so that all of the selectable delay networks are bypassed. The output of the phase equalizer 18 is applied to the input of the phase detector 70, and the phase-lock loop including amplifier filter 72 and voltage controlled oscillator 74 locks on the received carrier wave in quadrature relation thereto and produces an output corresponding to the quadrature component. The instantaneous phase error or distortion signal is derived from the phase detector output by the filter 76 and the rectifier-averager 78. Upon the occurrence of the clock generator pulse the distortion signal is applied through gate 84 and rectifier 90 to the memory capacitor 92. This change of voltage across capacitor 92 produces a trigger input to the one-shot pulse generator 140 and the output thereof is applied to the input C of each stage of the memory register 130 whereby the count in the binary counter 100 is transferred to the register 130. Upon the occurrence of the next clock pulse from the generator 86 the additional count is registered in the counter 100 and thus switch driver 110 is energized to connect the selectable delay network with the fixed delay network 30. This will cause a change in the phase disturbance of the carrier wave and a different value of distortion is measured by the measurement system 20. The clock pulse applied to the gate 84 provides for sampling of the new value of distortion signal and if it is more positive than the preceding value, the voltage on the capacitor 92 will be increased. An increased voltage across the capacitor 92 provides an input to the one-shot pulse generator 140 and the output thereof is applied to the inputs C of the memory register flip-flops. Thus, the count from the binary counter 100 is transferred to the register. Each succeeding clock pulse will be counted by the counter 100 and will cause the gate 84 to sample the new value of distortion signal from the measurement system 20. If the signal is less positive than the preceding signal, there will be no change of voltage across the capacitor 92 and the count stored in the register 130 will not be changed. Thus, the register 130 continues to retain the count which corresponds to the combination of selectable delay networks which produced the lowest value of phase distortion. When the clock pulses have advanced the counter a sufficient number so that all combinations of the selectable delay networks have been tried the final count will cause the end-of-count detector 142 to stop the clock pulse generator 86 and energize the switch driver 124. This in turn actuates the transfer switches 116, 118, and 120 to reconnect the combination of selectable delay networks as identified in the register 130 which produces the least value of phase distortion and hence the proper equalization for the transmission channel. The switch driver 124 also closes a switch 144 to discharge capacitor 92 and prepare the equalization system for the next cycle of operation.

Referring to FIGS. 7, 7*a*, and 7*b*, there is illustrated a diagram of a preferred embodiment of the inventive equalization system. This diagram is laid out so that the right sides of FIG. 7 and 7*a* are connected respectively with the left sides of FIGS. 7*a* and 7*b*. For illustrative purposes the system is shown and described with only four selectable delay networks, it being understood that a larger number may be employed if desired. Referring first to FIG. 7, the phase equalizer comprises selectable delay networks 32, 34, 36, and 40. Each of the selectable delay networks, as represented by network 32 takes the form of an all-pass network comprising an active filter 150, a summing amplifier 152 and a switching transistor 154. The input signal is applied through an isolation resistor 156 to the active filter which constitutes an amplitude peaking section suitably in the form of a bandpass amplifier. The output of the filter 150 is applied through a resistor 158 to the input of the summing amplifier 152 where it is combined with the input signal which is applied through a resistor 160 to the input of the amplifier 152. The switching transistor 154 has its collector to emitter circuit connected across the input of active filter 150 and its base-emitter circuit is connected through a resistor 162 to a switching input 164. When a positive voltage is applied to the input, the input signal on line 42 effectively bypasses the selectable delay network and is applied without envelope delay through the amplifier 152 to the input of the succeeding selectable delay network 34. Thus, each of the selectable delay networks 32, 34, 36, and 40 are provided with switching inputs 164, 166, 168, and 170, respectively, which are adapted upon the application of a positive voltage to switch the network out of the phase equalizer.

The output 68 of the phase equalizer is applied to the input of the distortion measurement system as shown in FIG. 7*a*. A phase-lock loop includes an amplifier stage 180 which supplies the input signal to one input of a phase detector 182, the output of which is applied through an amplifier and filter stage 184 to a voltage controlled oscillator 186. The voltage controlled oscillator controls a flip-flop 188 having one output connected to the other input of the phase detector 182. Considering the phase-lock loop in greater detail, the amplifier 180 comprises a transistor 190. The signal from the phase equalizer is applied through a capacitor 192 to the base electrode of the transistor 190. The base electrode is provided with a bias voltage from the positive supply voltage line 194 through a blocking diode 196 and voltage divider resistors 198 and 200. The emitter electrode is connected through a resistor 202 to the supply voltage line and the collector electrode is connected to ground through an output resistor 204.

The phase detector 182 comprises a transistor 206 and a transistor 208 having their collector electrodes connected together and through a resistor 210 to the supply voltage line. The emitter electrode of transistor 206 is connected through a resistor 212 to the base electrode of transistor 208, and the emitter electrode of transistor 208 is connected through a resistor 214 to the base electrode of transistor 206. One input to the phase detector is applied to the base electrode of transistor 206 from the output of the amplifier 180 and the other input is applied to the base electrode of transistor 208 from the output of the flip-flop 188. The output of the phase detector is taken from the collector electrodes on conductor 216 and applied to the amplifier-filter stage 184. The amplifier-filter stage comprises a transistor 220 having its base electrode connected to conductor 216 and its emitter electrode connected through a resistor 222 and a potentiometer resistor 224 to the supply voltage line 194. The collector electrode of transistor 220 is connected to ground through a filter capacitor 226 and resistor 228 which constitutes a low-pass filter network for the output of the stage. The output of amplifier-filter 184 is applied to the input of the voltage controlled oscillator 186 across a charging resistor 230 and input capacitor 232. The oscillator 186 comprises a unijunction transistor 234 having its emitter connected across the input capacitor 232, base-2 connected to the supply voltage line 194 through resistor 236 and base-1 connected to ground through the output resistor 238. The oscillator 186 has an output frequency which is controlled by the voltage across the capacitor 232 and hence by the output of the phase detector. The output of the oscillator 182 is applied to the input of the flip-flop 188 which has its Q-output connected to the input of the phase detector at the base electrode of transistor 208. In a well-known manner the output of the phase detector will cause the oscillator frequency to become equal to the carrier wave frequency applied to the other input of the phase detector and the phase of the output of flip-flop 188 will be locked in quadrature with the phase of the incoming carrier wave applied to the phase detector. The lock angle can be controlled by adjustment of the potentiometer resistor 224. When the quadrature relationship is established, the output of phase detector on conductor 216 will have a time average value of zero but its instantaneous value reflects the phase disturbance of the received carrier wave signal.

In order to recover the instantaneous phase error signal, the output of the phase detector 182 is applied over line 216 through a filter capacitor 240, which blocks the DC component to an amplifier stage 242. The amplifier output is applied through a low-pass filter 244 which eliminates the double-frequency component to a rectifier-averager 246 which produces a DC error signal corresponding to the phase distortion which is applied to amplifier 248. As shown in FIG. 7*b*, the error signal is applied to the input of a gate 250 and thence to a memory section 252 which stores the error or distortion signal. The gate 250 is also connected with a transistor switch 254 which is controlled by clock pulses.

Considering this part of the measurement system in greater detail, the output of the phase detector on line 216 includes the instantaneous phase error signal which is superimposed on the DC loop control signal and on the double carrier frequency which results from phase detection. The filter capacitor 240 blocks the DC component from the input of the amplifier 242. The amplifier comprises a transistor 260 having its emitter electrode connected to the positive supply voltage line 262 through a resistor 264 and its collector electrode is connected to the negative supply voltage line 266 through a resistor 268. The base electrode is connected to the junction of voltage divider resistor 270 and 272 which are connected from the positive supply voltage line to the negative supply voltage line through resistor 268. The output of the amplifier 242 is taken from the collector electrode of transistor 260 and applied to the input of the low-pass filter stage 244. The filter stage comprises a transistor 274 having its base electrode connected through a pair of input resistors 276 and 278 to the output of the amplifier 242. The collector electrode is connected to the positive supply voltage line 262 through a resistor 280 and the emitter electrode is connected to the negative supply voltage line through a resistor 282. A shunt capacitor 284 is connected between the junction of resistors 276 and 278 to the emitter electrode and a capacitor 286 is connected to the collector electrode to the base electrode. This filter stage 244 emphasizes the quadrature distortion components from the phase detector and the output thereof, taken from the emitter electrode, is applied to the rectifier-averager stage 246.

The rectifier includes a diode 290 with its cathode connected to the positive supply voltage line 262 and its anode connected through a coupling capacitor 292 to the output of filter stage 244. The rectifier also includes a diode 294 with its cathode connected to the coupling capacitor 292 and its anode connected to the junction of a resistor 296 and a capacitor 298 which are connected in series between the positive supply voltage line and ground. Thus, the rectifier 246 effectively functions as a full-wave rectifier with its output voltage clamped to the positive supply voltage. Consequently, the output voltage of the rectifier taken from the capacitor 298 is of positive polarity and having a magnitude which decreases as the instantaneous phase error signal or distortion signal increases and which increases as the phase error or distortion signal decreases. The output of the rectifier is applied across the averager circuit comprising a resistor 300 and a capacitor 302 so that the DC distortion signal is averaged over the time of several received pulses. The output of the rectifier-averager stage taken from the capacitor 302 and applied to the amplifier 248. This amplifier comprises a transistor 304 having its collector electrode connected to the positive supply line and the emitter electrode connected through an output resistor 306 to the negative supply voltage line. Its base electrode is connected to the capacitor 302. The output of the amplifier 248 is applied to the input of the gate 250 through a conductor 308.

This gate 250, as shown in FIG. 7*b*, comprises a transistor 310 with its emitter electrode constituting the signal input and being connected directly to the output of the amplifier 304. The base electrode of transistor 310 constitutes the gate input and is connected to the positive supply voltage line 312 through a resistor 314. The base electrode of transistor 310 is also connected through the transistor switch 254 which includes a transistor 316 with its collector electrode connected to the base electrode of transistor 310 and its emitter electrode connected through a resistor 318 to ground. The base electrode of transistor 316 is connected through a resistor 320 to a clock pulse line 322 to be described subsequently. The output of the gate 250 is connected to the input of the memory device 252. This memory device comprises a blocking diode 324 having its anode connected to the collector electrode of transistor 310 and its cathode connected to one terminal of a storage or memory capacitor 326 which has its other terminal connected to ground. Thus, it is apparent that the DC distortion signal developed by the rectifier-averager 246 is transferred through the amplifier 248 and the gate 250 to the storage device 252 upon the occurrence of a clock pulse at the transistor switch 254.

In order to develop a control signal upon the occurrence of a positive distortion signal of greater magnitude which is indicative of decreased phase distortion there is provided with the output of the memory device 252 an isolation amplifier 330 which is connected through an inverter and amplifier stage 332 to the input of a one-shot multivibrator 334 which develops the desired control voltage. Referring to these stages in greater detail the isolation amplifier 330 comprises a field effect transistor 336 having its emitter electrode connected to the capacitor 326, its base-2 connected to the positive supply voltage line and its base-1 is connected through a resistor 338 to the negative supply voltage line. The field effect transistor exhibits a very high input impedance and thus does not permit discharge of the storage or memory capacitor 326; however, an increased positive voltage across the memory capacitor causes the isolation amplifier 330 to produce an output pulse which is coupled to the inverter and amplifier stage 332. This stage comprises a transistor 340 having its collector electrode connected to the positive supply voltage line 342 through a resistor 344 and its emitter connected to ground through a resistor 346. The base electrode of the transistor is connected to the junction of voltage divider resistors 348 and 350 which are connected between the collector electrode and ground. The output of isolation amplifier 330 is coupled with the input of the inverter and amplifier stage 348 through a capacitor 352. The inverter and amplifier stage 332 develops a trigger voltage for the one-shot multivibrator 334. The multivibrator comprises a pair of transistors 360 and 362 which have their collector electrodes connected to the positive supply voltage line 342 through resistors 364 and 366 respectively, and which have their emitter electrodes connected directly to ground. The input trigger voltage from stage 332 is applied through a coupling capacitor 368 to the base electrode of transistor 360 which is connected through a resistor 365 to line 342 and a capacitor 367 to the collector of transistor 362. The base electrode of transistor 362 is connected to the negative supply voltage line through resistor 370 and is also connected to the collector of transistor 360 through a resistor 371. The output of the one-shot multivibrator 334 is taken from the collector of transistor 360 on conductor 372 for use in the control system which will be described subsequently.

The control system is provided with a clock pulse generator, as shown in FIG. 7*b*, which comprises an oscillator 380, an amplifier 382 and an inverter amplifier 384. The oscillator 380 comprises a unijunction transistor 386 having its emitter electrode connected to the junction of resistor 388 and a capacitor 390 which are connected in series between the positive supply voltage line and ground. Base-2 of the unijunction transistor is connected to the positive supply voltage line through a resistor 392. Base-1 of the transistor is connected through a resistor 394 and a resistor 396 in series to ground. Thus, the oscillator 380 will produce an output voltage across the resistor 396 having a frequency determined largely by the values of resistor 388 and capacitor 390.

The amplifier 382 comprises a transistor 400 having its base electrode connected to the junction of resistors 394 and 396, its collector electrode connected through resistor 402 to positive supply voltage line and its emitter electrode connected directly to ground. Thus, the amplified output voltage of the oscillator 380 is developed at the collector electrode of amplifier 382 and applied to the input of the inverter amplifier 384. The output clock pulses are applied over a conductor 322 to the switch 254 which controls the gate 250 as previously described. The clock pulses are also applied on conductor 404 to the input of the binary counter 410.

The binary counter 410, as shown in FIG. 7, comprises flip-flops 412, 414, 416, and 418. Each of the flip-flops, as described with reference to FIG. 6, is a T flip-flop which changes state upon the occurrence of each input pulse at its C-input. The Q-output of flip-flop 412 is applied to the C-input of flip-flop 414. The Q-output of flip-Flop 414 is applied to the C-input of flip-flop 416 and similarly the Q-output of flip-flop 416 is applied to the C-input of flip-flop 418. All of the Q-outputs of the flip-flops in the binary counter are connected individually to the separate inputs of the NAND-circuit 420 which constitutes an end-of-count detector. The NAND-circuit 420 will produce an output signal when a preset count is reached corresponding to the total number of combinations of selectable delay networks in the equalizer. This output signal is applied to an inverter amplifier 422, the output of which is utilized to shut down the test period of the automatic equalizer and reconnect the equalizer for data transmission. For this purpose the output of the inverter amplifier 422 (FIG. 7) is connected through a conductor 424 and resistor 426 (FIG. 7 *b*) to the base of transistor 428 which has its collector-emitter circuit connected across the memory capacitor 326 through a resistor 430. Thus, a positive end-of-count pulse on conductor 424 causes transistor 428 to become conductive and thereby discharge the capacitor 326 to ground. The end-of-count pulse from the inverter amplifier 422 is also connected to the clock pulse generator to terminate operation thereof. For this purpose, the output of the inverter amplifier 422 is connected through resistor 432 (FIG. 7*b*) to the base of transistor 434 which has its collector-to-emitter circuit connected through a resistor 436 and across the capacitor 390 of the oscillator 380. Thus, the occurrence of a positive end-of-count pulse causes transistor 434 to become conductive and provide a shunt path around the capacitor 390, disabling the oscillator 380. The clock pulse generator may be restarted by the closure of a start switch 440 connected across the base-emitter circuit of the transistor 434. This switch is effective to render transistor 434 nonconductive and thereby restore capacitor 390 in the oscillator circuit 380 and initiate oscillation thereof.

The binary counter 410 is effective to control the selection of the selectable delay networks 32, 34, 36, and 40 through the intermediary of NAND-circuits 442, 444, 446, and 448 respectively. For this purpose the Q-output of flip-flop 412 is connected to one input of NAND circuit 442 and similarly the Q-outputs of flip-flops 414, 416, and 418 are connected respectively to one input of the NAND-circuits 444, 446, and 448. The remaining input of each of these NAND circuits is connected through conductor 450 to the output of the end-of-count detector or NAND-circuit 420. Thus, in the absence of an end-of-count pulse or signal from the NAND-circuit 420 each of the NAND-circuits 442, 444, 446, and 448 will produce a positive output if the other input is supplied with a 0 output from its corresponding flip-flop in the binary counter 410. Thus, it is apparent that the selectable delay network 32 will be switched off when there is a "1" output from the NAND-circuit 442 applied to the switching input 164 which results from "0" output from the flip-flop 412. Similarly, the selectable delay networks 34, 36, and 40 will be switched off when the Q-output of the corresponding flip-flop is "0." Upon the occurrence of the next count, the Q-output of the flip-flop 412 will be a "1" and the NAND-circuit 442 will produce a "0" output thereby switching on the selectable delay network 32. It is thus apparent that the combination of selectable delay networks is determined by the count in the binary counter 410 and that all combinations will be connected in succession before the end-of-count signal is produced.

In order to identify and register the count which produced the desired or most favorable equalization of the transmission channel, there is provided a memory register 460. The register comprises flip-flops 462, 464, 466, and 468, each of which is of the D-type and includes C- and D-inputs and is adapted to change its state upon the simultaneous occurrence of the input signals and thereby produce an output "1" or "0" at its Q-output depending upon the previous state. The memory register 460 is adapted to register the count in the binary counter 410 upon the occurrence of an output from the one-shot multivibrator 334. For this purpose the flip-flops 462, 464, 466, and 468 have their C-inputs connected through conductor 372 to the output of the multivibrator 334 and the respective D-inputs connected respectively to the Q-outputs of the flip-flops 412, 414, 416, and 418 in the binary counter. So that the output of the register 460 may exercise control over the selectable delay networks, the Q-outputs of the flip-flops 462, 464, 466, and 468 are connected respectively to one input of the NAND-gates 470, 472, 474, and 476. The other input of each of these NAND gates is connected through a conductor 478 to the output of the inverter amplifier 422 which produces a positive output in response to the end-of-count signal from the NAND-circuit 420. Thus, when the end-of-count signal is developed the output of NAND-circuit 420 and applied over conductor 450 to the NAND-circuits 442, 444, 446, and 448 it effectively disables the connection of the flip-flops 412, 414, 416, and 418 to the switching inputs 164, 166, 168, and 170, respectively, of the selectable delay networks. At the same time the register 460 assumes control of the selectable delay networks by reason of the end-of-count signal from inverter amplifier 422 which effectively connects the flip-flops 462, 464, 466, and 468 with the switching inputs 164, 166, 168, and 170, respectively.

The operation of the system shown in FIGS. 7, 7*a*, and 7*b* may be summarized as follows: To initiate operation of the automatic equalization system, the start switch 440 is closed and, accordingly, the clock pulse generator including oscillator 380 is started. This is effective to terminate the output signal from the end-of-count detector or NAND-circuit 420 and, accordingly, the memory 252 is placed in readiness by rendering transistor 428 nonconductive. Similarly, the signal on line 478 is removed from NAND-gates 470, 472, 474, and 476 to place the selectable delay networks under the control of the binary counter 410. With the counter thus reset to zero, the first series of test pulses is received over the transmission channel and through the fixed delay network 30 and is applied through the amplifier 180 to the phase detector 182. The phase-lock loop including amplifier-filter 184 and the voltage controlled oscillator 186 operates in response to the output of the phase detector to produce an oscillator frequency equal to the carrier wave frequency and locked in phase therewith in a quadrature relationship. The output of the phase detector is applied through the filter capacitor 240 to eliminate the DC component to the amplifier 242, through the low-pass filter 244 to reject the double-frequency component, and thence to the rectifier-filter 246. The rectifier-filter thus develops a DC distortion signal which is averaged over several pulses and applied through the amplifier 248 to the gate 250. The gate 250 is opened by the switch 254 upon the occurrence of the clock pulse and the DC distortion signal is applied to the memory stage 252 and stored on capacitor 326.

The next clock pulse will advance the binary counter by one count and thus turn on the selectable delay network 32, i.e., connect it in series with the fixed delay network 30. The next series of test pulses will be supplied in the manner just described through the filter capacitor 240, amplifier 242, the low-pass filter 244 to the rectifier-averager 246 which develops a DC distortion signal which is averaged over several pulses. This DC distortion signal is applied through the gate 250 which is opened by the clock pulse by transistor switch 254. If the DC distortion signal is more positive and hence indicative of lower distortion than the preceding signal stored on capacitor 326 the signal will be applied through diode 324 and will increase the voltage across the capacitor 326. This increasing voltage across the capacitor 326 will be detected by the isolation amplifier 330 and the amplifier 332 will apply a trigger pulse to the one-shot multivibrator 334. The output of the multivibrator is applied to the conductor 372 to the C-inputs of the flip-flops in the memory register 460 thereby permitting the count in the binary counter 410 to be registered through the D-inputs of the flip-flops on the register.

On the occurrence of the next clock pulse a similar sequence occurs with a different combination of selectable delay networks being connected in the equalizer. If the DC distortion signal developed by the rectifier-averager 248 is more positive than the preceding signal, the one-shot multivibrator 334 will produce an output and transfer the count from the binary counter 410 to the memory register 460. On the other hand, if the output of the rectifier-averager is less positive than the preceding signal, no trigger voltage is applied to the multivibrator 334 and the corresponding count in the binary counter is not transferred to the memory register. When the final clock pulse occurs and causes the connection of the last combination of the selectable delay networks, the end-of-count circuit or NAND-circuit 420 and the inverter amplifier 422 produce an output which is effective through the transistor 434 to stop the clock pulse generator and which is effective through the transistor 428 discharge the memory capacitor 326. The output of the inverter-amplifier also is effective through conductor 478 to enable the NAND-circuits 470, 472, 474, and 476 to control the selection of the selectable delay networks 32, 34, 36, and 40, respectively, in accordance with the count stored in the memory register 460. At the same time the output from the NAND circuit on conductor 450 is effective to disable the NAND-circuits 442, 444, 446, and 448 so that the final count in the binary counter 410 is ineffective in the control of the selectable delay networks. Thus, the combination of selectable delay networks which produced the most favorable equalization during the test period is automatically reconnected upon the signal from the end-of-count detector and the equalizer is placed in readiness for data transmission.

Although the description of this invention has been given with respect to particular embodiments thereof, it is not to be construed in a limiting sense. Many variations and modifications of the invention will now occur to those skilled in the art. For a definition of the invention, reference is made to the appended claims.

The embodiments of the invention in which an exclusive property or privilege is claimed are defined as follows:

1. The method of equalizing a data transmission channel having an envelope delay as a function of frequency which is similar to the characteristic envelope delay of transmission channels of the same type, comprising the steps of providing a fixed delay network and a plurality of selectable delay networks each having a predetermined envelope delay as a function of frequency over the bandwidth of said channel, said first delay network having an envelope delay which is similar to the difference between said characteristic envelope delay and a desired envelope delay, said predetermined envelope delay of the selectable delay networks being selected so that the combination of any one or more thereof with said fixed delay network produces a composite envelope delay which deviates over a portion of said bandwidth from the aforesaid difference whereby the desired envelope delay of said data transmission channel may be closely approximated by the combination of said fixed delay network with certain selectable delay networks, successively connecting the combination of said channel and said fixed delay network with different combinations of said selectable delay networks to form a successive plurality of test channels, transmitting a series of test pulses over each successive test channel, said test pulses being transmitted on a pulse amplitude modulated carrier wave with a vestigial sideband, measuring the phase distortion of each series of test pulses by measuring the quadrature component of the received carrier wave, comparing the phase distortion of each series of test pulses with that of each other series of test pulses, and reconnecting the combination of selectable delay networks which produced the smallest value of phase distortion to the combination of said fixed delay network and said channel to provide equalization of said channel for data transmission.

2. The method of equalizing a data transmission channel comprising the steps of: transmitting a pulse amplitude modulated carrier wave over said channel by transmitting a vestigial sideband, successively connecting different combinations of delay networks with the output of said channel to form a successive plurality of test channels, measuring the average value of instantaneous phase shift of the received carrier wave for each successive test channel by measuring the average value of the quadrature component of the received carrier wave, comparing said average value of instantaneous phase shift of the carrier wave for each test channel with that of each other test channel, and reconnecting the combination of delay networks which produced the smallest average value of instantaneous phase shift in the received carrier wave to said channel for equalization thereof for data transmission.

3. The invention as defined in claim 2 wherein the step of comparing the phase distortion of each series of test pulses with that of each other series of test pulses is performed by producing an error voltage corresponding in magnitude to each measurement, storing said error voltage until a succeeding measurement produces an error voltage corresponding to a lower phase distortion and then storing the last-mentioned error voltage, counting the number of combinations of selectable delay networks which have been connected with said channel and registering the count which corresponds to the combination which produced the measurement represented by the error voltage being stored.

4. Apparatus for equalizing a data transmission channel comprising a plurality of selectable delay networks, control means for successively connecting different combinations of said delay networks with the output of said channel to form a successive plurality of test channels, measuring means for measuring the phase distortion of a pulse amplitude modulated carrier wave transmitted over each successive test channel, said measuring means including means adapted to receive a pulse amplitude modulated carrier wave transmitted as a vestigial sideband and produce an error voltage corresponding to the quadrature component of the received carrier wave as a measure of the phase shift, comparing means connected with the measuring means for comparing the phase distortion for each test channel with that of each other test channel, said control means including reconnecting means for reconnecting the combination of delay networks which produced the smallest value of phase distortion to said channel for equalization thereof for data transmission.

5. The invention as defined in claim 4 wherein the comparing means includes storage means for storing the error voltage corresponding to the lowest value of quadrature component, counting means for counting the number of combinations of selectable delay networks which have been connected with said channel, and register means for registering the count which corresponds to the combination which produced the error voltage in the storage means.

* * * * *